United States Patent Office 3,425,837
Patented Feb. 4, 1969

3,425,837
PREPARATION OF ANIMAL FEED PHOSPHATE
Joseph G. Conte, Oakhurst, Paul S. Spitaleri, Colonia, Milton Stern, Metuchen, and Theodore B. Simpson, Plainfield, N.J., assignors, by mesne assignments, to Continental Oil Company, a corporation of Delaware
No Drawing. Filed Sept. 2, 1964, Ser. No. 394,056
U.S. Cl. 99—2                          13 Claims
Int. Cl. A23k 1/00; C01b 25/32

ABSTRACT OF THE DISCLOSURE

Calcium phosphate of a grade suitable for animal feed use is produced directly from phosphate rock by reacting it with phosphoric acid in an amount equivalent to 150–250% of the theoretical amount to produce monocalcium phosphate, at a temperature of about 140–300° C., steam stripping the resulting slurry, and neutralizing excess acid.

DISCLOSURE

This invention relates to processes for the defluorination of phosphatic materials and more particularly to processes for producing high-grade mono and dicalcium phosphates, which are substantially free of fluorine, from phosphate rock.

Fluorine is a constituent in practically all native phosphatic material, such as phosphate rock, the amount varying in the different areas in which it occurs. For example, Florida phosphate rock usually contains between 3.5% and 4.0% of fluorine. Research on the nutrition of animals, particularly poultry, has demonstrated that high-grade mono and/or dicalcium orthophosphate is a superior form of calcium-phosphorus mineral feed supplement. To produce a feed grade calcium orthophosphate, fluorine must be substantially removed from the acidulated phosphate rock. The Association of American Feed Control Officials specifies animal feed phosphate must not contain more than 1 part by weight of fluorine per 100 parts by weight of phosphorus.

It is an object of the invention to produce high-grade phosphatic materials of low fluorine content, suitable for use as animal feed supplements.

It is another object of the invention to produce calcium orthophosphates (and calcium pyrophosphate) having a low fluorine content, suitable for use as animal feed supplements.

It is a further object to produce high availability calcium orthophosphate (and calcium pyrophosphate) suitable for use as animal feed supplement from low-grade phosphate rock as a starting material using a process that does not need to operate at temperatures whereat metaphosphate is formed.

Other objects of the invention will become apparent in the full description of the instant novel process.

It has been discovered that calcium phosphate of animal feed quality having a phosphorous/fluorine ratio content of at least 100, preferably about 130, and essentially entirely available phosphorus content is produced by treating particulate phosphate rock with phosphoric acid in an amount of at least about 150% of the stoichimetric requirement to obtain monocalcium phosphate, at a temperature between about 140° C. and 300° C., preferably 170°–210° C., while maintaining a slurry condition in the reaction zone, and sparging the slurry with steam to remove overhead volatile fluorine compounds.

In some instances it is difficult to maintain the slurry condition; the addition of sulfuric acid to the reaction zone permits maintaining a suitable slurry condition.

Phosphate rock is the source of phosphate charge to the process of the invention. The rock is introduced into the reaction zone in particulate (comminuted) form, preferably 99+% passing through a 100 mesh size Tyler sieve.

The phosphate rock is reacted with aqueous phosphoric acid. In general, it is desirable to use acid having a concentration of about 65–85% $H_3PO_4$. A surprising advantage of the process of the invention lies in its ability to use the economically attractive wet process phosphoric acid (commonly 54% $P_2O_5$). Wet process acid contains between about 0.3% and about 1.0% fluorine. The instant process not only defluorinates the phosphate rock but also the acid reactant to produce a animal feed supplement quality product. Therefore wet process phosphoric acid is the preferred acid reactant; the commercial grade is about 75% $H_3PO_4$ content.

In addition to the production of mono calcium phosphate, the reaction produces fluorine compounds that are relatively volatile at reaction temperature. The presence of a steam sparging medium removes overhead these volatile fluorine compounds; by using enough steam it is possible to decrease the fluorine content of the product to the maximum permitted in animal feed, i.e., a phosphorus to fluorine weight ratio of at least 100. The fluorine content can be decreased to substantially 0% (zero) by using very large amounts of steam.

Water ($H_2O$) appears to play a role in the defluorination reaction because gas sparging, in the absence of steam, is relatively ineffective for fluorine removal. The steam may be introduced in the reaction zone as such, or in conjunction with an inert gas such as flue gas used for heating the reaction zone, or in the form of liquid water, which produces steam in situ. The minimum amount of steam used is dependent on the fluorine content of the phosphate rock charged. For typical Florida phosphate rock, the steam is added in an amount of at least about 1.5 lb. per lb. of defluorinated product. It has been observed that the minimum amount of steam needed is not only determined by the amount of fluorine present, but also by the efficiency of contacting of the slurry with the sparging steam, which contacting is an equipment function.

In this process, the desired reaction between the phosphate rock and the phosphoric acid whereby a highly defluorinated monocalcium phosphate class of animal feed supplement is produced, a product in which the $P_2O_5$ values are substantially fully available in animal nutrition, is brought about under conditions in which the comminuted rock is suspended in a sufficient excess of the phosphoric acid to form a slurry, i.e., a homogeneous suspension of phosphate solid particles in phosphoric acid, having fluid properties. It has been established the stoichiometric amount of phosphoric acid to convert the rock to monocalcium phosphate is insufficient to maintain the slurry condition over the time needed to defluorinate the rock. In general, at least about 150% of the amount of phosphoric acid as $H_3PO_4$ theoretically needed to produce a monocalcium phosphate product must be charged to the reaction zone. It is preferred to use phosphoric acid in about 200–250% of theory.

It is to be understood that the amount of phosphoric acid present is not the only factor in maintaining the slurry condition throughout the reaction. The amount and rate of steam charged and the presence of an inert gas have a bearing on the ability to maintain the slurry condition.

Chemical changes such as the conversion of orthophosphate and pyrophosphate to metaphosphate occur at certain temperatures. Unlike the orthophosphate and the pyrophosphate, the metaphosphate is insoluble and therefore unavailable as far as animal nutrition is concerned.

Incipient metaphosphate formation may be expected at temperatures in excess of 300° C., and for this reason, when preparing animal feed materials having high $P_2O_5$ availability, heating to temperatures above about 300° C. is to be avoided.

The slurry of phosphoric acid and rock is reacted at a temperature of between about 140° C. and 300° C., preferably about 170°–210° C. Prolonged heating at temperatures much above 250° C. should be avoided to minimize the conversion of the available phosphate to the unavailable form.

It has been observed that the conversion of the rock to the monocalcium phosphate proceeds very rapidly, particularly at about 200° C. But the defluorination time is "dependent" on the rate of steam addition, at substantially constant amount of defluorination. However, it appears that the manner of agitation of the slurry, the manner of steam addition, and the depth of slurry have a bearing on the defluorination time.

The reaction product consists substantially of monocalcium phosphate admixed with unreacted phosphoric acid. Under the aforesaid conditions, the phosphate is essentially entirely available as feed supplement. It is mainly in the monocalcium orthophosphate form, with some relatively minor amounts of calcium pyrophosphate (also an available $P_2O_5$ form in animal nutrition).

It is easier to convert the unreacted phosphoric acid to calcium orthophosphate than to separate the mixture. Therefore, it is preferred to add a basic calcium compound to the product mixture to convert the excess phosphoric acid to monocalcium phosphate. However, it may be desirable to add enough basic calcium to the product mixture to obtain a dicalcium phosphate product or a mixture of the mono and dicalcium phosphates. The term "available calcium phosphate" excludes the tricalcium phosphates because these are insoluble and not available.

An adequate slurry condition can be maintained during the defluorination time by controlling each of the aforesaid variables. However, it has been observed that some combinations of conditions result in a loss of the slurry condition—the rock-phosphoric acid mixture becomes too viscous to stir or even the mixture "sets-up" into a hard, rock-like mass.

It has been discovered that the slurry condition can be maintained more readily or even recaptured, if lost more or less momentarily, by adding sulfuric acid to the reaction zone. Preferably the sulfuric acid is added when signs of loss of slurry stability first appear in the reaction zone, e.g., a sharp increase in viscosity. A combination of conditions which inherently produce an unstable slurry can be rectified by incremental addition of, in many cases, quite small quantities of sulfuric acid over the defluorination time. The amount of sulfuric acid added varies widely but, in general, lies between about 1% and about 10% calculated as weight percent of the theoretical requirement of $P_2O_5$ for producing monocalcium phosphate product.

The concentration of the sulfuric acid is not critical. Desirably the concentration is in excess of about 50%; preferably the concentration is about 90–100% of $H_2SO_4$; fuming acid may be used.

ILLUSTRATIONS

The following examples illustrate the processes of the invention carried out in two different sizes of equipment. It is to be understood that these examples are not limiting on the scope of the invention.

Examples 1–3

The phosphate rock used in these examples was a Florida rock containing 32.42% total $P_2O_5$ (T.P.A.), 45.97% total CaO, and 3.9% fluorine. These were determined by the Official Methods of Analysis of the Association of Official Agricultural Chemists (1960). The rock was ground to a Tyler sieve size.

| Mesh: | Percent through |
|---|---|
| 100 | 99 |
| 150 | 90–92 |
| 200 | 70–72 |

The phosphoric acid used in these examples contained 74.98% $H_3PO_4$ which is equivalent to 54.28% $P_2O_5$.

All of these examples were carried out in a 2 liter, 3 necked flask. Heat was supplied by a heating mantle and agitation was supplied with a laboratory mixer. Steam (low pressure) was added through a laboratory glass sparger, which was below the surface of the slurry.

These examples were carried out by the addition of the phosphate rock to the acid at room temperature. The resulting slurry was then heated to 130–140° C. with agitation, at which time, steam was sparged below the surface of the slurry. Digestion and steaming of the slurry was continued for 1 hour at about 150° C. with the exception of No. 3 which was treated at about 135° C. due to a "setting up" of the slurry at higher temperatures. Total steam consumption in all three examples was equivalent to one pound of steam per pound of defluorinated product.

The slurry was then removed from the flask and the excess acid was neutralized with CaO to produce a finished product with a CaO:$P_2O_5$ mole ratio of 1.0. The final products were dried at 160° C. for several hours before being analyzed.

The details of these examples are set out in Table I.

TABLE I

| Example | 1 | 2 | 3 |
|---|---|---|---|
| Grams rock | 200 | 400 | 500 |
| Grams acid | 660 | 1,335 | 1,340 |
| Appearance of slurry | Fluid | Fluid | Fluid |
| $P_2O_5$ | 64.8 | 129.7 | 162.1 |
| $P_2O_5$ | 358.2 | 724.7 | 727.4 |
| Total $P_2O_5$, g | 423.0 | 854.4 | 889.5 |
| Total rock CaO, g | 91.9 | 183.9 | 229.5 |
| CaO: $P_2O_5$ mole ratio in reactor | 0.550 | 0.545 | 0.654 |
| Grams $P_2O_5$ required for monocalcium phosphate (rock CaO basis) | 232.7 | 465.4 | 531.8 |
| Theoretical $P_2O_5$ addition in acid necessary for rock conversion, grams | 167.9 | 335.7 | 419.7 |
| Excess $P_2O_5$ in acid, grams | 190.3 | 389.0 | 307.7 |
| $P_2O_5$ in acid as percent of theor. requirement | 213.4 | 215.9 | 173.4 |
| Grams CaO added to neutralize excess acid | 75.2 | 153.7 | 121.6 |
| Final CaO:$P_2O_5$ mole ratio | 1.000 | 1.000 | 1.000 |

The quality of the limed product in terms of fluorine content and phosphorus availability for animal feed is set out in Table II.

TABLE II

| Run No. | Percent total $P_2O_5$ | Percent available [1] $P_2O_5$ | Percent fluorine | P:F ratio |
|---|---|---|---|---|
| 1 | 57.6 | 57.4 | .13 | 194:1 |
| 2 | 59.5 | 59.4 | .11 | 221:1 |
| 3 | 57.8 | 57.4 | .15 | 167:1 |

[1] Percent available $P_2O_5$ was determined by the method of Reynolds, D. S., Hill, W. L., Jacob, K. D., J.A.O.A.C., 27, 4, 559–571, (1944).

Examples 4–10

These examples were carried out in larger scale equipment. The Florida phosphate rock was 70 BPL rock (70% tricalcium phosphate equivalent) containing 32.26 TPA and 47.35 CaO; it was ground to the same mesh size as the rock of Examples 1–3. The phosphoric acid used was 75% $H_3PO_4$ wet process acid, containing about 0.43% fluorine. In these examples 200% of the theoretical requirement of phosphoric acid was used. Other runs had established this to be about the optimum level for this equipment. When used, the sulfuric acid was 66° Baumé (93% $H_2SO_4$). The saturated steam sparging gas was at slight super-atmospheric pressure. All these examples were at 180° C.

Equipment consisted of an acid-rock mixer, a stripping-mixing vessel and a lime neutralizing section. In the development work, a 3 gallon stainless steel bucket served as the acid rock mixer and the fluorine stripper. The slurry depth in the bucket was 3 to 6 inches depending on the batch size and the mixing pattern. The stripper was heated by external flame or by modified submerged combustion. Steam addition was accomplished by inserting a sparger into the slurry. (Sulfuric acid was stored in a dropping funnel and when used, was added dropwise to the surface of the slurry.) Neutralization with limestone was done in a Hobart Mixer. All the runs were made batchwise.

It was found that thorough mixing of the slurry was necessary to provide good steam contact and to maintain slurry fluidity. The viscosity of the slurry is quite high and exhibits thixotropy. One of the major difficulties was the tendency of the slurry to set up; this rendered the proved to be a triple blade type with blades extended close to the walls of the reactor. The lower blade swept the bottom of the vessel clean, while the upper blade generally was at the slurry level, thus eliminating as much of the "dead" spots as practical. A ¼ H.P. Lightnin Mixer was installed and handled, with little difficulty, 10 and 20 lb. batches.

Both direct and indirect heating was employed. Indirect heating consisted of directing an open gas flame on the bottom of the vessel. This provided easy temperature control and was satisfactory as far as the process was concerned.

However, the phosphoric acid destroyed the stainless steel reactor very rapidly in the hotter regions where the flame contacted the vessel. To find a suitable, more economical heating means, modified submerged combustion (direct heating) was employed. For a preliminary test of direct heating, compressed air was heated to 900° F. by applying a gas burner to a section of the air line. The hot air was then sparged into the slurry.

To determine whether combustion gas with its $H_2O$ content might have a favorable effect on the product, a laboratory scale submerged combustion apparatus was modified so that the flame burned in a section of pipe external to the slurry reactor at a pressure sufficient to force the combustion gas through the gas sparger. The combustion gas was quenched with compressed air before it entered the slurry in order to provide gas temperature control. The temperature of gas entering the slurry was 1000–1500° F.

It was concluded that the degree of defluorination is independent of the method of heating.

With this phosphate rock, a product fluorine content (before liming) of 0.20% corresponds to a phosphorus/fluorine weight ratio of 100; 0.18% fluorine corresponds to a P/F ratio of 130.

When the slurry was sufficiently defluorinated the excess acid in the slurry was neutralized with a basic salt such as limestone. The slurry can be limed to yield $CaO/P_2O_5$ mole ratio from 1 to 2. A typical slurry product, prepared for chick feeding tests, was neutralized and diluted with limestone to yield a feed containing 19% phosphorus which is comparable to commercial animal feeds. The $CaO/P_2O_5$ mole ratio was 1.71 which lies between a dicalcium and a monocalcium phosphate.

Example 4

A batch of 2000 g. rock and 6440 g. acid was mixed and heated directly. When the slurry temperature reached 180° C., hot air was sparged into the slurry. Water was added below the slurry level through a distributor pipe. In order to maintain 180° C., the external flame had to be used in addition to the hot air sparger. The following samples were taken:

| Sample No. | Time, min. | Cumulative water, g. | Percent F | Lb. $H_2O$/lb. product |
|---|---|---|---|---|
| 1 | 56 | 4,000 | 0.38 | 0.67 |
| 2 | 116 | 8,000 | 0.22 | 1.33 |
| 3 | 169 | 12,000 | 0.15 | 2.00 |
| 4 | 200 | 14,000 | 0.13 | 2.33 |

This batch remained very fluid throughout the run. No sulfuric acid was required.

Example 5

1000 g. rock and 3220 g. phosphoric acid were mixed in the slurry pot and heated to 180° C. by an external flame. Combustion gas and steam were then sparged separately into the slurry. The external flame was removed and insulation put in place under the pot. The pot temperature fell to 160° C. and was held there by combustion gas at 1000° F. The combusion gas temperature was raised to 1500° F. about halfway through the run and the slurry temperature rose to 180° C. and was held. The following samples were taken:

| Sample No. | Elapsed time, min. | Cumulative steam, g. | Percent F | Lb. steam/ lb. product |
|---|---|---|---|---|
| 1 | 44 | 2,660 | 0.38 | 0.86 |
| 2 | 74 | 4,660 | 0.21 | 1.50 |
| 3 | 92 | 6,660 | 0.14 | 2.14 |
| 4 | 101 | 7,460 | 0.13 | 2.40 |

During the run 60 cc. (110 g.) of sulfuric acid were added dropwise to the slurry. In addition, 50 ml. of liquid water were added in small amounts to help maintain fluidity. After running 90 minutes, the slurry started to get stiff and it was necessary to add 65 cc. (120 g.) of sulfuric acid.

Example 6

1000 g. rock and 3265 g. 75% $H_3PO_4$ were mixed in the slurry pot and heated to 180° C. Steam, at a temperature of 180° C. was sparged into the slurry. Fifty-five grams of sulfuric acid were added when the slurry temperature first reached 180° C. The mix was fluid until the very end of the run, when it thickened. The following samples were taken:

| Sample No. | Time, min. | Cumulative steam, g. | Percent F | Lb. steam/ lb. product |
|---|---|---|---|---|
| 1 | 13 | 3,340 | 0.33 | 1.14 |
| 2 | 32 | 5,340 | 0.22 | 1.57 |
| 3 | 54 | 7,340 | 0.15 | 2.16 |
| 4 | 75 | 9,340 | 0.12 | 2.75 |

Example 7

2000 g. rock and 6440 g. 75% $H_3PO_4$ were mixed and heated to 180° C. with an external burner. The flame was removed and hot air (900° F.) and steam were sparged separately into the slurry. The following samples were taken.

| Sample No. | Time, min. | Cumulative steam, g. | Percent F | Lb. steam/ lb. product |
|---|---|---|---|---|
| 1 | 37 | 3,980 | 0.33 | 0.71 |
| 2 | 71 | 7,980 | 0.17 | 1.42 |
| 3 | 111 | 11,980 | 0.11 | 2.17 |
| 4 | 144 | 15,980 | 0.06 | 2.85 |

A total of 455 cc. (835 g.) of concentrated $H_2SO_4$ was required to maintain fluidity. This amounts to 13% by weight of the phosphoric acid requirement. Defluorination versus steam consumption appears to be better than usual, probably due to the better steam-slurry contact in the deeper bed; deeper than a regular run.

Example 8

A batch of 1000 g. rock and 3350 g. 72% $H_3PO_4$ was mixed and heated in the usual manner. An external burner provided heat throughout the run. Steam was sparged into the slurry. Thirty-five cc. H₂SO₄ were added after the acid and rock were mixed. The following samples were taken:

| Sample No. | Time, min. | Cumulative steam, g. | Percent F | Lb. H₂O/lb. product |
|---|---|---|---|---|
| 1 | 21 | 2,600 | 0.33 | 0.74 |
| 2 | 40 | 4,600 | 0.22 | 1.31 |
| 3 | 65 | 6,600 | 0.13 | 1.88 |
| 4 | 92 | 8,600 | 0.11 | 2.45 |
| 5 | 113 | 10,600 | 0.07 | 3.02 |
| 6 | 127 | 12,600 | 0.06 | 3.59 |
| 7 | 150 | 14,600 | 0.04 | 4.16 |
| 8 | 176 | 16,600 | 0.03 | 4.73 |
| 9 | 198 | 18,600 | 0.02 | 5.30 |
| 10 | 222 | 20,600 | 0.02 | 5.87 |
| 11 | 240 | 22,600 | 0.02 | 6.43 |
| 12 | 264 | 24,600 | 0.02 | 7.00 |

Example 9

A study of the data available from a large number of runs established that defluorination was, within the reproducibility of the data, independent of time of heating and seemingly dependent on the rate and amount of steam introduced. The defluorination data fall in a band about 0.5 lb. of steam per lb. of product wide. At 0.2% fluorine content, the steam usage was in the range of 1.25–1.75 lbs./lb. with the best line at about 1.5 lbs./lb. At P/F ratio of 130, 0.18% F, the steam usage line is at about 1.8 lbs./lb.

The effect of change in operating conditions on steam usage is shown by the fact that better defluorination at a given steam usage was obtained when the slurry bed was 6 inches deep than when the slurry bed was 3 inches deep.

Example 10

Samples of limed product, reagent grade monocalcium phosphate and reagent grade dicalcium phosphate were sent to a research foundation for phosphorus nutritional availability studies. The availability is determined by adding the phosphate material at various phosphate levels to feed for randomly distributed lots of chicks. The material analyses were as follows:

| Sample | Material | CaO | TPA | Percent available P |
|---|---|---|---|---|
| AF 1 | Monocalcium phosphate reagent grade. | 23.25 | 60.30 | 99.5 |
| AF 2 | Dicalcium phosphate reagent grade. | 42.88 | 51.60 | 100 |
| AF 3 | AAC Co. slurry product. | 27.65 | 41.00 | 99.3 |

Data submitted established that all products—AF–1, AF–2, AF–3—are equal to dicalcium phosphate in their growth promoting and bone ash formation properties in young chicks.

Thus having described the invention, what is claimed is:

1. A process for producing animal feed grade calcium phosphate from phosphate rock, which process consists essentially of:
   (a) reacting particulate phosphate rock and aqueous phosphoric acid at a temperature between about 140° C. and 300° C. with agitation to maintain a slurry condition in the reaction zone, said phosphoric acid as $P_2O_5$ being present in an amount between about 150 and about 250% of the amount theoretically needed to produce a monocalcium phosphate product,
   (b) passing steam through said slurry to sparge and remove overhead volatile fluorine compounds formed during the reaction, said passing being continued until the ratio of phosphorus to fluorine content of the phosphate slurry is at least 100, and
   (c) subsequently neutralizing excess acid of said slurry.

2. The process of claim 1 wherein the excess phosphoric acid is neutralized with a basic calcium compound to obtain a substantially available calcium phosphate product.

3. The process of claim 1 wherein said phosphoric acid has a concentration of about 65–85%.

4. The process of claim 1 wherein said phosphoric acid is present in an amount of about 200–250% of theory.

5. The process of claim 1 wherein said temperature is about 170°–210° C.

6. The process of claim 1 wherein said steam usage is at least about 1.5 lbs. per lb. of defluorinated phosphate product.

7. The process of claim 1 wherein sulfuric acid is, added to aid in maintaining a slurry condition of said reactants.

8. The process of claim 7 wherein said sulfuric acid concentration is about 90–100%.

9. The process of claim 8 wherein said sulfuric acid usage is about 1–10% of the theoretical requirement of phosphoric acid.

10. The process of claim 7 wherein said sulfuric acid is added incrementally over the reaction period as needed to maintain the slurry condition.

11. A process for producing animal feed grade calcium phosphate from phosphate rock, which process consists essentially of:
   (a) forming a slurry of particulate phosphate rock in phosphoric acid and reacting said rock with said acid, while maintaining a slurry condition, at a temperature of about 170–210° C., said phosphoric acid having a concentration of about 65–85%, and being present in an amount, as $P_2O_5$, of about 200–250% of the theoretical requirement to convert said rock to monocalcium phosphate, said reacting being effected in the presence of about 0–10%, based on theoretical $P_2O_5$ requirement, of 90–100% sulfuric acid, the amount of sulfuric acid being sufficient to maintain a slurry condition during said reacting,
   (b) passing steam through said slurry to sparge and remove overhead volatile fluorine compounds formed during said reacting, said steam being added in an amount of at least about 1.5 lbs. per lb. of defluorinated slurry, and
   (c) subsequently neutralizing excess acid of said slurry, whereby there is obtained an available calcium phosphate product havin a phosphorus to fluorine weight content ratio of at least 100.

12. The process of claim 11 wherein said unreacted phosphoric acid is converted to substantially available calcium phosphate.

13. The process of claim 11 wherein said steam is generated in situ by adding liquid water to said slurry.

References Cited

UNITED STATES PATENTS

| 2,759,795 | 8/1956 | Archer | 23—109 |
| 2,895,799 | 7/1959 | Le Baron et al. | 23—109 |
| 3,151,938 | 10/1964 | Seidman | 23—109 |

A. LOUIS MONACELL, Primary Examiner.

J. M. HUNTER, Assistant Examiner.

U.S. Cl. X.R.

23—109